(12) United States Patent
Furuta et al.

(10) Patent No.: US 6,702,297 B2
(45) Date of Patent: Mar. 9, 2004

(54) METAL GASKET FOR USE IN ENGINE WITH CHAIN CASE

(75) Inventors: Yutaka Furuta, Ikoma (JP); Hiroshi Uemura, Daito (JP); Tomoyoshi Ogaeri, Neyagawa (JP)

(73) Assignee: Nippon Gasket Company, Ltd., Osaka (JP)

( * ) Notice: Subject to any disclaimer, the term of this patent is extended or adjusted under 35 U.S.C. 154(b) by 0 days.

(21) Appl. No.: 09/994,656

(22) Filed: Nov. 28, 2001

(65) Prior Publication Data

US 2002/0063394 A1 May 30, 2002

(30) Foreign Application Priority Data

Nov. 30, 2000 (JP) .......................... 2000-365419

(51) Int. Cl.[7] ................................. F02F 11/00
(52) U.S. Cl. .................. 277/592; 277/591; 277/597
(58) Field of Search ................ 277/591, 592, 277/597

(56) References Cited

U.S. PATENT DOCUMENTS

| | | | | | |
|---|---|---|---|---|---|
| 4,477,094 A | * | 10/1984 | Yamamoto et al. | .......... | 277/592 |
| 4,485,138 A | * | 11/1984 | Yamamoto et al. | .......... | 277/592 |
| 4,629,199 A | * | 12/1986 | Yamamoto et al. | .......... | 277/592 |
| 4,754,982 A | * | 7/1988 | Udagawa et al. | ........... | 277/596 |
| 5,544,901 A | * | 8/1996 | Kubouchi et al. | .......... | 277/591 |
| 5,895,056 A | * | 4/1999 | Habuta et al. | ............... | 277/591 |
| 5,975,540 A | * | 11/1999 | Miyaoh | ...................... | 277/593 |
| 6,056,296 A | * | 5/2000 | Ii | ................................. | 277/592 |
| 6,349,944 B1 | * | 2/2002 | Sugiyama et al. | .......... | 277/591 |
| 6,354,599 B1 | * | 3/2002 | Inamura | ..................... | 277/591 |
| 6,478,305 B1 | * | 11/2002 | Iwata | ......................... | 277/591 |

FOREIGN PATENT DOCUMENTS

| | | |
|---|---|---|
| JP | 63-48059 | 4/1988 |
| JP | 5-94570 | 12/1993 |
| JP | 2597677 | 12/1993 |
| JP | 06-281012 | 10/1994 |
| JP | 07-119836 | 5/1995 |
| JP | 07-133870 | 5/1995 |
| JP | 10-292865 | 11/1998 |

* cited by examiner

Primary Examiner—Anthony Knight
Assistant Examiner—Christopher J. Boswell
(74) Attorney, Agent, or Firm—Armstrong Teasdale LLP

(57) ABSTRACT

A metal gasket used in an engine with a chain case, using a foam-rubber seal member shaped to withstand in practical use and having excellent long-lasting reliability and excellent durability. A total constitutive plate of the metal gasket is extended along the chain case to form an extended part. This extended part has a chain case hole. The foam-rubber seal member seals a chain case opening and a three-surface joining portion defined by the chain case, a cylinder block and a cylinder head. The foam-rubber seal member is a separate and distinct member and is a sheet-like and loop-like combination of layers of foam rubber and a metal core plate interposed between these foam rubber layers.

7 Claims, 11 Drawing Sheets

METAL GASKET FOR USE IN ENGINE WITH CHAIN CASE

FIELD OF THE INVENTION

The present invention relates to a metal gasket for use in an engine with a chain case and more particularly, relates to a metal gasket for sealing a three-surface joining portion defined by a cylinder head extended along the chain case, a cylinder block and the chain case in the engine with the chain case.

BACKGROUND OF THE INVENTION

It is common for an engine with a chain case to have by nature a stepped part on an upper end face of a cylinder block and the chain case in a three-surface joining portion defined by a cylinder head, the cylinder block and the chain case, and in most cases, this stepped part expands due to a difference in thermal expansion associated with the operation of the engine. To seal this three-surface joining portion, foamed cellular elastic material such as foam rubber in particular finds increased use as a sealing component. The reason is as follows. Compared to ordinary rubber, this foam rubber has self-compressibility and flexible compressibility and also has great flexibility with respect to external force. With the use of this flexibility, the foam rubber can find application to a gasket having a reduced tightening thickness.

Known prior techniques for such a metal gasket sealing the three-surface joining portion are as follows.

(1) As disclosed in Japanese Unexamined Patent Publication No. 7-133870 (1995), a seal member having foamed cellular and elastic materials and a metal core interposed between these materials is provided to an area corresponding to the three-surface joining portion.

(2) As disclosed in Japanese Utility Model Registration No. 2,597,677 (see FIG. 11), auxiliary plate (adjusting plate) 51 serving as one constitutive metal plate is extended along the chain case to be formed with chain case hole 52, and both sides of plate 51 are covered with respective closed-cell expanded sealing members 53, 53 covering their respective entire regions surrounding this hole 52. It is to be noted that an element denoted by reference number 54 in the drawing is a main plate (bead plate).

(3) As disclosed in Japanese Unexamined Utility Model Publication No. 63-48059 (1988) or Japanese Unexamined Patent Publication No. 7-119836 (1995), one constitutive metal plate is extended along the chain case to be formed with a chain case hole and is provided with a soft sheet covering the entire region of its either side or each side that surrounds this hole.

(4) As disclosed in Japanese Unexamined Patent Publication No. 10-292865 (1998), constitutive plates are all extended along the chain case, the surface of the constitutive metal plate that faces the three-surface joining portion is formed with a full bead, and a recessed part of this full bead is filled with elastic material.

One problem associated with the sealing of the three-surface joining portion is that oil is likely to leak when turned into mist at high temperatures. Such leakage is most likely to occur at a point where a leakage passage becomes widest as a result of the expansion of the stepped part of the three-surface joining portion at the start from low temperatures. The expansion of the stepped part is caused by a difference in thermal expansion between an aluminum chain case and a cast-iron cylinder block that is associated with cooling and heating.

With the above-described conventional examples, the seal members of which are made of foam rubber or the like and are each provided to only the area corresponding to the three-surface joining portion, a clearance is likely to appear between the seal member and the constitutive plate of the gasket in the vicinity of a mounting part for the seal member, and if the above-described expansion of the stepped part takes place, complete sealing with a high degree of reliability cannot be accomplished.

The foam rubber itself has the advantageous properties mentioned earlier. However, in cases where foam rubber having a high expansion ratio in particular is used as an elemental sheet, shape stability and durability of this foam rubber become poor, so that the above-mentioned advantages and these disadvantages are two sides of the coin. In other words, the foam rubber is susceptible to fracture resulting from strain, deformation or flow caused by external force and hence cannot secure stable surface pressure over a long period. For this reason, the elemental sheet of foam rubber is unfit for use as a relatively large seal member, and the above-described conventional techniques each using this elemental sheet, under 100–150° C. atmosphere, as a seal member, which requires long-lasting reliability and durability, for the chain case are mostly impracticable.

The present invention addresses the problems discussed above and aims to provide a metal gasket for use in an engine with a chain case, the metal gasket having excellent long-lasting reliability and excellent durability and using a foam-rubber seal member shaped to withstand in practical use.

SUMMARY OF THE INVENTION

To accomplish the above-described object, a metal gasket for use in an engine with a chain case in accordance with a first aspect of the invention comprises:

at least two constitutive plates forming a total constitutive plate comprising:
an extended part for each of the plates extended along the chain case; and
a chain case hole for each of the plates formed in the extended part; and
a foam-rubber seal member, mounted to a surface of the extended part for one of constitutive plates that faces the chain case, for sealing a chain case opening and a three-surface joining portion defined by the chain case, a cylinder block and a cylinder head,
wherein the foam-rubber seal member is a separate and distinct member and is a sheet-like and loop-like combination of layers of foam rubber and a metal core plate interposed between the layers of foam rubber, and the metal core plate is distinct from the constitutive plates.

According to the present invention, sealability at an edge of the chain case opening can be secured because the foam-rubber seal member having self-compressibility, flexible compressibility and great flexibility forms a seal loop along the edge of the chain case opening with covering all over the sealing surface of the chain case opening and the three-surface joining portion defined by the chain case, the cylinder block and the cylinder head. In addition, the foam-rubber seal member is reinforced by having the metal core plate between the layers of foam rubber, thereby obtaining stabilized shape, excellent long-lasting reliability and excellent durability compared to the elemental sheet used as the foam-rubber seal member.

In the present invention, one of the constitutive plates is preferably a bead plate disposed next to the cylinder head, and the foam-rubber seal member is preferably mounted to the extended part of this bead plate. Here, this bead plate may be made of any material selected appropriately, provided that it is an elastic metal plate, and the thickness of this bead plate may also be selected appropriately.

A metal gasket for use in an engine with a chain case in accordance with a second aspect of the present invention comprises:

a first bead plate disposed next to a cylinder head;

a second bead plate disposed next to a cylinder block;

at least one intermediate constitutive plate interposed between the first and second bead plates, the first and second bead plates and the intermediate plate forming a total constitutive plate comprising:

an extended part for each of the plates extended along the chain case; and a chain case hole for each of the plates formed in the extended part; and a foam-rubber seal member, mounted to a surface of the extended part of the first bead plate that faces the chain case, for sealing a chain case opening and a three-surface joining portion defined by the chain case, the cylinder block and the cylinder head, wherein the first bead plate comprises, in the extended part, a small chain-case hole partially defined by a retainer which overhangs the chain case and is opposed to the chain case opening, and a half bead formed in the vicinity of an outside of an outer edge of the foam-rubber seal member, the small chain-case hole being provided narrower in a longitudinal direction of the first bead plate than the chain case opening, wherein each of the plates other than the first bead plate comprises, in the extended part, a large chain-case hole being opposed to the chain case opening, being wider in a longitudinal direction of the constitutive plate than the chain case opening and being of the nearly same shape as the chain case opening, wherein the foam-rubber seal member comprises, at an edge of a border of the foam-rubber seal member, an overhang of small width extending over a stepped part of the three-surface joining portion to a sealing surface of the cylinder block, the edge of the border of the foam-rubber seal member being about the cylinder block, wherein, the outer edge of the foam-rubber seal member matches an inner edge of the large chain-case hole in shape, wherein an inner edge of the foam-rubber seal member matches an outer edge of the small chain-case hole in shape, wherein the foam-rubber seal member is fixed to the first bead plate at the retainer of the first bead plate, wherein the intermediate constitutive plate is, in the extended part, free from a half bead in the vicinity of the outside of the outer edge of the foam-rubber seal member, and wherein the second bead plate comprises a half bead opposed to the half bead of the first bead plate.

With the adoption of such a structure, practicality and reliability can be compatible with each other for the following reason. The respective half beads of the first and second bead plates are provided side by side about the outside of the foam-rubber seal member, and the retainer in particular stabilizes pressed shape of the foam-rubber seal member. In combination with excellent properties such as self-compressibility, great compressibility, great flexibility and good sealability that are inherent in the form-rubber seal member, these advantages result in essential sealing of the edge of the chain case opening. It is to be noted here that the number of intermediate constitutive plates, and thickness of and material for the intermediate constitutive plate can be selected appropriately. Preferably, one intermediate constitutive plate including a folded part around each bore hole is used, or two intermediate constitutive plates, that is, this intermediate constitutive plate and another intermediate plate are used.

In the present invention, it is preferable that the following structure is adopted. In a free state prior to tightening, total thickness of the foam-rubber seal member is greater than total thickness of a layered metal portion of the metal gasket that corresponds to the cylinder block. In a compressed state subsequent to tightening, the total thickness of this layered metal portion functions as a stopper for preventing full compression of the foam-rubber seal member. The retainer of the first bead plate functions as a stabilizing plate for stabilizing the pressed shape of the foam-rubber seal member.

With such a structure, in the compressed state subsequent to tightening, the foam-rubber seal member projecting from the retainer above the chain case opening becomes partially embedded in the chain case opening due to a difference in compressed quantity, thus covering an end of the edge of the chain case opening that corresponds to the foam-rubber seal member, covers the three-surface joining portion and an edge of a border of the cylinder block that is close to the chain case and also seals a leakage passage caused by the stepped part of the three-surface joining portion. This leakage passage corresponds to (thickness of a chain case gasket)×(an amount of withdrawal of an upper end face of the chain case gasket) and is usually a large space when viewed as an object to be completely sealed. However, this leakage passage is sealed, without fail, by a great quantity of compression, which is one of the properties of the foam-rubber seal member. It is to be noted that the foam rubber preferred most is closed-celled. A preferred void content ranges from 50 to 85%, and a closed cell content is preferably 50% or more, and more preferably 70% or more.

It is preferable that the retainer of the first bead plate and the foam-rubber seal member corresponding to the retainer each have two or more fixing and centering knock holes, and the knock holes of the retainer pair up with the respective knock holes of the foam-rubber seal member corresponding to the retainer.

The foam-rubber member can be fixed by one of mechanical fixings of various types including caulking, use of an eyelet and the like or by an adhesive. In cases where the caulking is utilized, a selection can be made from a split type (split caulking type) such that a partial notch and an enlarged part are formed, a crimp type such that only a cylindrical recessed part is formed and others. Even in cases where a plurality of foam-rubber seal members are stacked one on top of another, the fixing preferred most includes fixing using the fixing and centering knock holes and fixing of either the split type or the crimp type, and the number of the fixings of either the split type or the crimp type is preferably two. In cases where a space for the caulkings cannot be secured because of a small permissible space of the chain case that permits a chain to pass through and limited width of the overhanging retainer, a claw dig type such that a plurality of claws dug, along the width of the gasket, into the mating plate (e.g. the first bead plate or the thin intermediate constitutive plate) to which the foam-rubber seal member is fixed hold the foam-rubber seal member, a clinch type such that a grommet formed at a free end of the mating plate or the retainer holds the foam-rubber seal member therein or the like may be adopted.

In each of the inventions described above, it is preferable that two or more layers of the foam-rubber seal members are stacked one on top of another. Thus, the stabilization of the shape and the sealing can be enhanced.

In each of the inventions, the foam-rubber seal member may be provided so as to include or not to include the entire regions surrounding respective bolt holes of the chain case.

The foam rubber of the foam-rubber seal member may be made of any kind of material such as NBR, H-NBR or the like, provided that oil resistance can be secured. Also, a kind of material for the metal core plate is not specifically limited, and a sheet of SPCC, for example, can find use as the metal core plate. Moreover, bonding of the metal core plate and the layers of foam rubber can be selected appropriately. The foam-rubber seal member typically used is a sheet with a metal core plate, both sides of which are coated with respective layers of rubber and then foamed and vulcanized by heat treatment.

Liquid seal can be used in combination with the foam-rubber seal member to seal the three-surface joining portion. Moreover, an arbitrary surface of the constitutive metal plate can be provided with a coating of arbitrary ordinary rubber for micro-sealing. Further, the respective sealing structures for cylinder holes, water holes, oil holes and the others can be selected appropriately.

DESCRIPTION OF THE PREFERRED EMBODIMENTS

Exemplary embodiments of the present invention are concretely demonstrated hereinafter with reference to the accompanying drawings.

Figure 1:
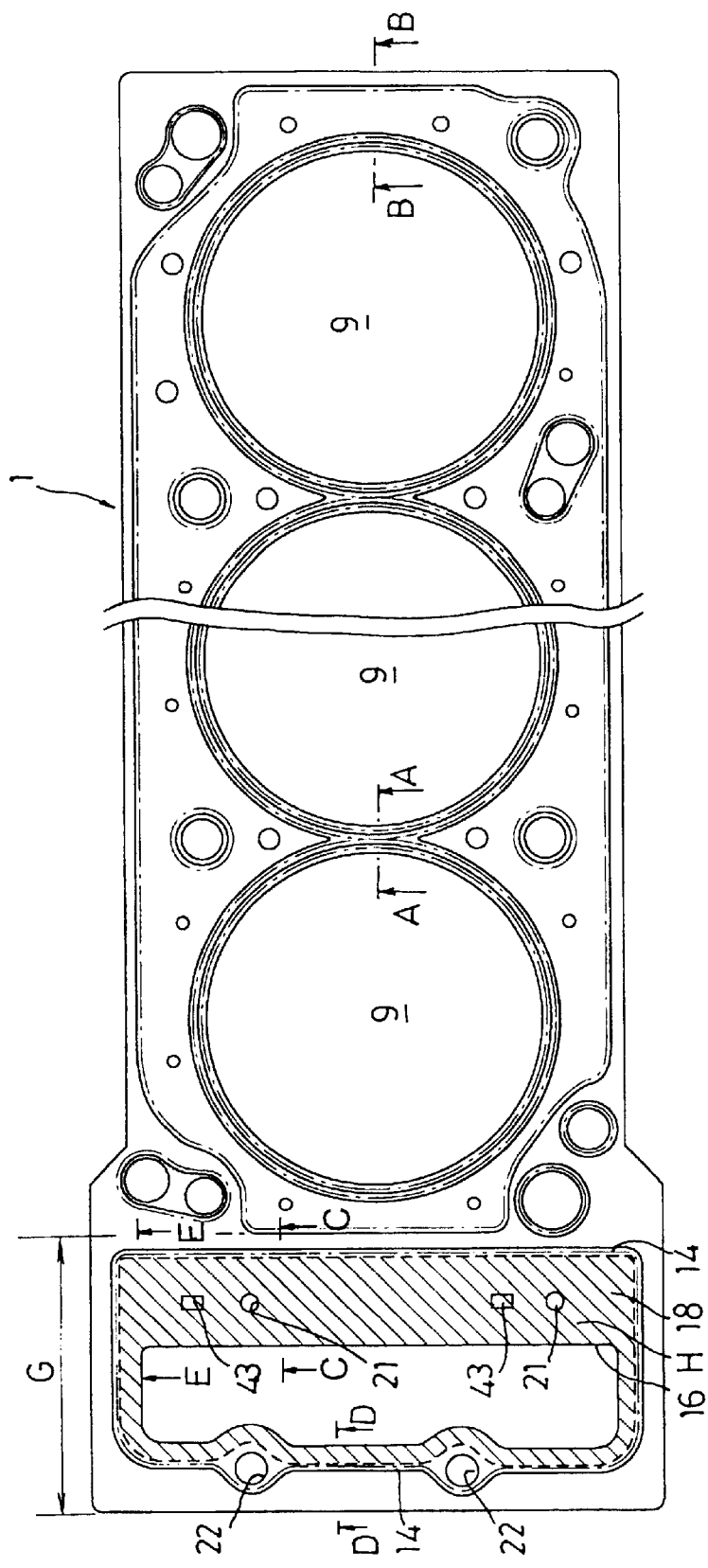
FIG. 1 is a plan view of a metal gasket in accordance with one exemplary embodiment of the present invention.

FIG. 1 is a plan view of a metal gasket in accordance with one exemplary embodiment of the present invention. FIGS. 2–5 are sectional views taken along respective lines A—A, B—B, C—C and D—D of FIG. 1, and FIG. 6 is a sectional view taken along line E—E of FIG. 1 in a compressed state subsequent to tightening.

Metal gasket 1 of the present embodiment is interposed between cylinder block 3 to which chain case 2 permitting a camshaft driving chain to travel is attached and cylinder head 4 and is used to provide a seal between opposed surfaces of a three-surface joining portion defined by these chain case 2, cylinder block 3 and cylinder head 4. Here, chain case 2 is formed as a component separate from cylinder block 3 and attached to a side of cylinder block 3 via chain case gasket 5.

Figure 2:
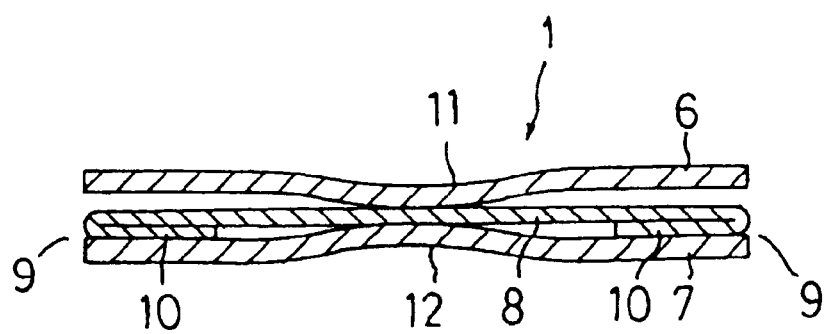
FIG. 2 is a sectional view taken along line A—A of FIG. 1.
Figure 3:
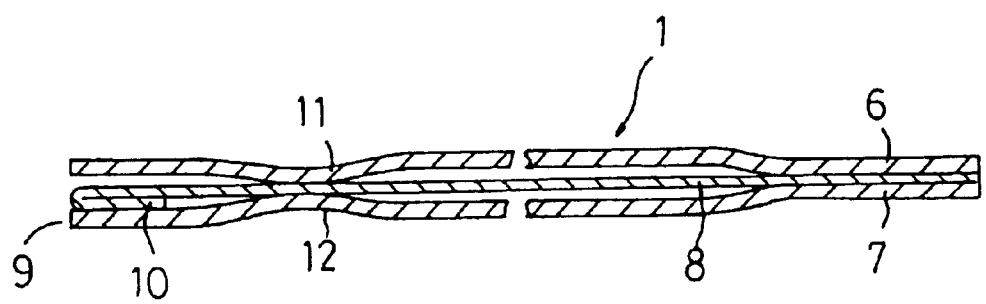
FIG. 3 is a sectional view taken along line B—B of FIG. 1.

Metal gasket 1 is a laminate comprised of three metal plates, that is, first bead plate 6, second bead plate 7 and intermediate constitutive plate (folded stopper plate) 8 interposed between bead plates 6, 7. Intermediate plate 8 has folded stopper parts 10 around respective bore holes 9. Bead plates 6, 7 include respective full beads 11, 12 formed around each bore hole 9, and center lines of full beads 11 and center lines of full beads 12 join into one between neighboring bore holes 9, 9. As shown in FIGS. 2 and 3, folded stopper parts 10 abut on second bead plate 7 in a free state prior to tightening. However, whether they abut or not is determined by a relationship of height between the full bead and a peripheral bead. In formation of folded stopper part 10, whether a clearance is provided between the opposed bead plates and whether this clearance is filled with an appropriate soft member can be selected arbitrarily. Full beads 11, 12 may each be made of adjacent half beads.

First bead plate 6 includes half bead 14 formed along the periphery of opening (chain case opening) 13 formed in chain case 2. Similarly, second bead plate 7 is formed with half bead 15 opposed to half bead 14.

The total constitutive plate comprised of first bead plate 6, second bead plate 7 and intermediate plate 8 is provided with extended part G (see FIG. 1) extended along chain case 2. In this extended part G, first bead plate 6 is provided with retainer (overhang) H that is opposed to chain case opening 13 and overhangs chain case 2, and small chain-case hole 16 narrower in a longitudinal direction of first bead plate 6 than chain case opening 13 is partially defined by this retainer H.

Second bead plate 7 and intermediate plate 8 are formed with respective large chain-case holes 17, 17 opposed to chain case opening 13 in extended part G. These holes 17, 17 are wider in a longitudinal direction of their constitutive plates 7, 8 than chain case opening 13 and of the nearly same shape as opening 13.

Foam-rubber seal member 18 (hatched in FIG. 1) is mounted to a surface of retainer H of first bead plate 6 that faces chain case 2. This foam-rubber seal member 18 is a separate and distinct member and is a sheet-like and loop-like laminate comprised of layers 19, 19 of foam rubber and metal core plate 20 interposed between layers 19, 19. This seal member 18 has, at an edge of its border that is about cylinder block 3, an overhang of small width J that extends over stepped part I (see FIG. 4) of the three-surface joining portion defined by chain case 2, cylinder block 3 and cylinder head 4 to a sealing surface of cylinder block 3. In the free state prior to tightening, preferred thickness of each foam rubber layer 19 ranges from about 0.2 to about 1.0 mm, and preferred thickness of metal core plate 20 ranges from about 0.1 to about 0.2 mm. The foam rubber may be made of any kind of material such as NBR, H-NBR or the like, provided that oil resistance can be secured. Also, a kind of material for the metal core plate is not specifically limited, and a sheet of SPCC, for example, can find use as the metal core plate.

Foam-rubber seal member 18 is fixed to first bead plate 6 at retainer H of bead plate 6, and an inner edge of this seal member 18 matches an inner edge of small chain-case hole 16 in shape, while an outer edge of this seal member 18 matches an inner edge of each large chain-case hole 17 in shape. In the present embodiment, retainer H has two centering knock holes 21, 21 bored through retainer H in pairing up with knock holes of seal member 18, and seal member 18 is fixed to first bead plate 6 at this retainer H by mechanical caulkings 43, 43. In FIG. 1, caulkings 43, 43 are situated at respective two places on a line connecting knock holes 21, 21 for the purpose of building up the fixing.

Figure 4:
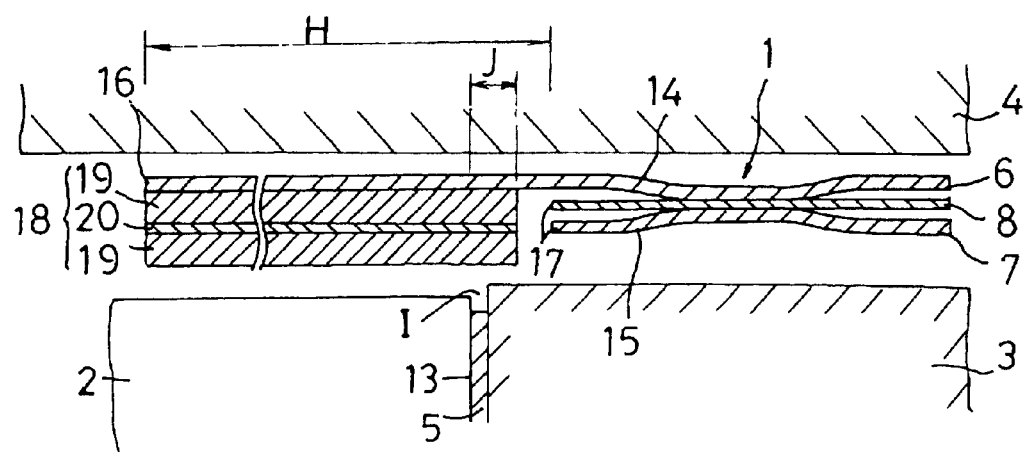
FIG. 4 is a sectional view taken along line C—C of FIG. 1.
Figure 5:
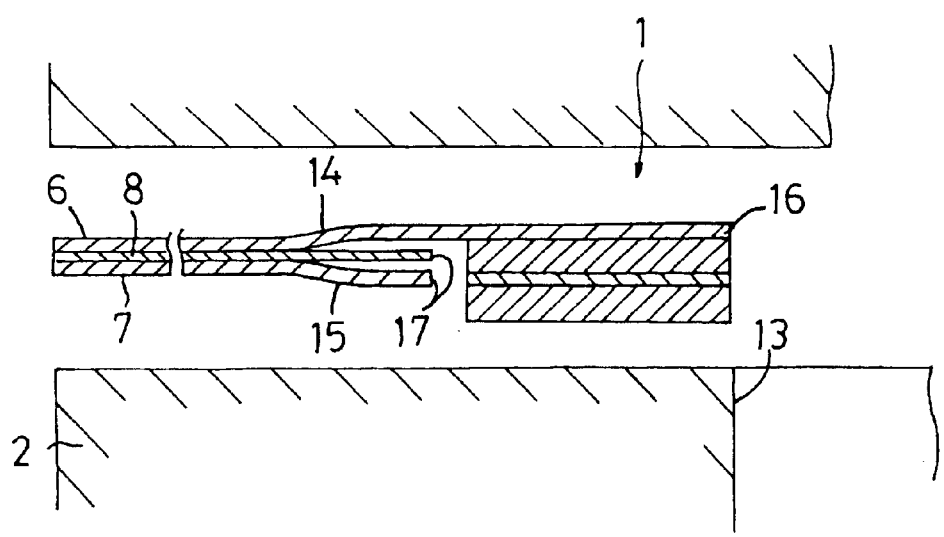
FIG. 5 is a sectional view taken along line D—D of FIG. 1.
Figure 6:
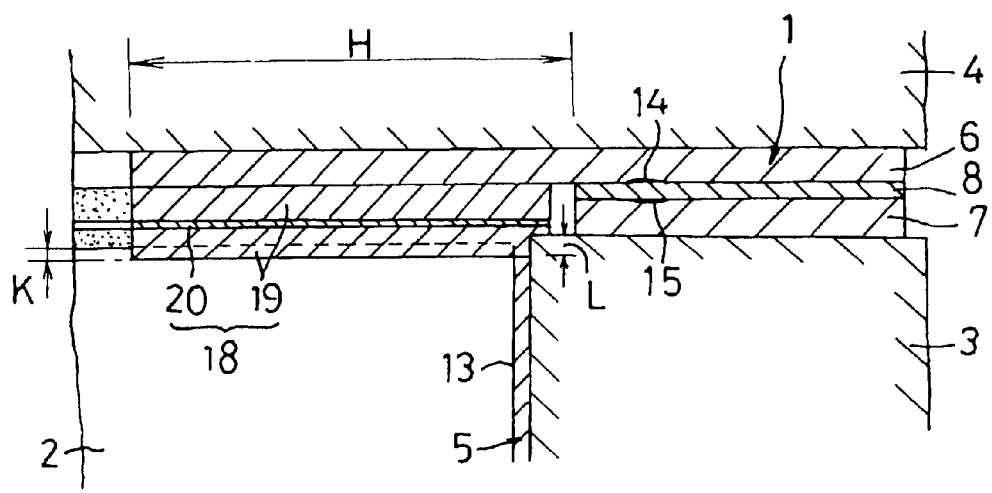
FIG. 6 is a sectional view taken along line E—E of FIG. 1 in a compressed state subsequent to tightening.

As shown in FIGS. 4 and 5, total thickness of foam-rubber seal member 18 is set greater than total thickness of a layered metal portion of the total constitutive plate that corresponds to cylinder block 3 and chain case 2 in the free state prior to tightening. In the compressed state subsequent to tightening, as shown in FIG. 6, seal member 18 performs sealing about chain case opening 13 by amount K of covering and also performs sealing at the three-surface joining portion by amount L of covering. Concurrently with these sealings, metal core plate 20 stabilizes the shape of seal member 18, the layered metal portion of the total constitutive plate that is positioned above cylinder block 3 serves as a stopper with respect to seal member 18, and retainer H of first bead plate 6 stabilizes the pressed shape of seal member 18.

Amount K of covering about chain case opening 13 that is caused by foam-rubber seal member 18 preferably ranges from about 0.5 to about 1.5 mm (this range also applies to a case of a four-layer gasket which will be described later). In practice, to secure specified design surface pressure and this covering amount K, values such as a void content, elastic modulus and others of the foam rubber, the thickness of the foam rubber, the number of layers of foam-rubber seal member 18 and others are selected appropriately. Typically, with adoption of design conditions which can yield this covering amount K, stepped part I of the three-surface joining portion can be sealed completely in most cases, depending on its size.

According to the present embodiment, the stabilization of the shape of foam-rubber seal member 18 by means of metal core plate 20, the sealing attributed to the covering of the three-surface joining portion and chain case opening 13 with seal member 18, the stopper function of the layered metal portion of the total constitutive plate with respect to seal member 18 and the stabilization of the pressed shape of seal member 18 by means of retainer H of first bead plate 6 yield compatibility among excellent properties including self-compressibility, great compressibility, great flexibility and good sealability that are inherent in the foam rubber, practicality and reliability. Thus, the metal gasket for an engine with the chain case that has excellent long-lasting reliability and excellent durability and withstands in practical use can be obtained.

The present embodiment has referred to a single layer of foam-rubber seal member 18. However, even in the three-layer gasket, like the one of the present embodiment, a plurality of foam-rubber seal members can be stacked one on top of another. It is to be noted that even in the case of such a plurality of foam-rubber seal members stacked, the total thickness of the layered metal portion corresponding to cylinder block 3 needs to function as a stopper with respect to the foam-rubber seal members, and this stopper function needs to be reinforced, to some extent, with the half bead which is positioned next to cylinder block 3 in the vicinity of the foam-rubber seal members.

Foam-rubber seal member 18 may be disposed so as to cover the entire regions surrounding respective bolt holes 22, 22 of the chain case. However, this is limited to cases where such space for seal member 18 and its external space for half beads 14, 15 can be obtained. If seal member 18 is disposed so as to cover the entire regions surrounding respective bolt holes 22, 22, the foam-rubber seal member itself experiences most bolt tightening force, so that total thickness of extended part G does not function as a stopper, resulting in a slight disadvantage in regulation of tightening surface pressure.

Figure 7:
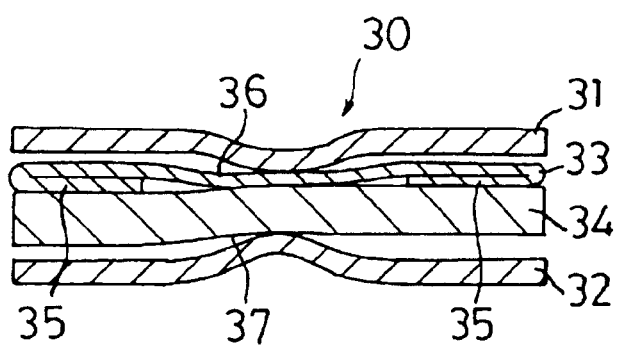
FIG. 7 is a sectional view (which corresponds to the sectional view taken along A—A of FIG. 1) of a metal gasket in accordance with another exemplary embodiment of the present invention.
Figure 8:
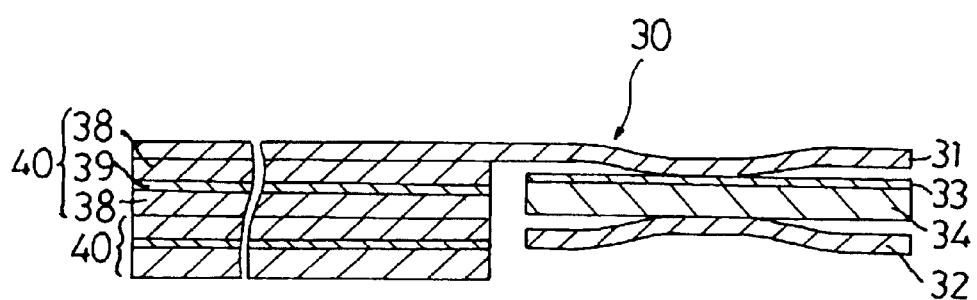
FIG. 8 is a sectional view (which corresponds to the sectional view taken along C—C of FIG. 1) of the metal gasket in accordance with another exemplary embodiment of the present invention.

FIG. 7 is a sectional view (which corresponds to the sectional view taken along A—A of FIG. 1) of a metal gasket in accordance with another exemplary embodiment of the present invention, and FIG. 8 is a sectional view (which corresponds to the sectional view taken along C—C of FIG. 1) of the same metal gasket.

Metal gasket 30 of this embodiment is a laminate comprised of four metal plates, that is, first bead plate 31, second bead plate 32, two intermediate constitutive plates (first intermediate constitutive plate 33 and second intermediate constitutive plate 34) interposed between these bead plates 31, 32. First intermediate plate 33 is a stopper plate having folded parts 35 around respective bore holes and bent parts 36, while second intermediate plate 34 has bent parts 37 functioning as stoppers with respect to beads of second bead plate 32, respectively. Even in this embodiment, full beads formed on bead plates 31, 32 may each be made of adjacent half beads.

In this embodiment as shown in FIG. 8, two layers of foam-rubber seal members 40 each having layers 38, 38 of foam rubber and metal core plate 39 interposed between layers 38, 38 are provided to adapt to the increased total thickness of a layered metal portion corresponding to the cylinder block, namely, the increased total thickness of the gasket that corresponds to an engine body.

According to this embodiment, the foam rubber having a high void content and a high closed cell content is not used as an elemental foam-rubber seal member but is used as a layer, so that great flexibility and good sealability of this foam rubber can be obtained, and consequently, practicality and reliability can be compatible with each other.

This embodiment has referred to the two layers of the foam-rubber seal members. However, such layers of the foam-rubber seal members are not limited to the four-layer gasket, like the one shown in the drawing. In other words, if the total thickness of the gasket corresponding to the engine body is increased, two to three layers of the foam-rubber seal members each having the metal core plate are stacked one on top of another. Consequently, excessive deflection of the foam rubber can be suppressed, the appropriate amounts of covering such as described above can be obtained, and the stabilization of the shape can be improved further.

Figure 9:
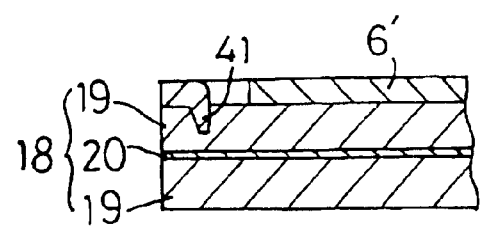
FIG. 9 is a sectional view illustrating a fixing structure using a claw dig type.

In each of the embodiments described above, the foam-rubber seal member has been fixed to the first bead plate by the mechanical caulkings. However, in cases where there is no space for width of the overhanging retainer, as shown in FIG. 9, a fixing structure using a claw dig type may be adopted. Specifically, a plurality of claws 41 may be dug into the retainer of first bead plate 6' to hold foam-rubber seal member 18. It is to be noted that each claw 41 can be made smaller, so that claw 41 to be dug can be positioned close to small chain-case hole 16.

Figure 10:
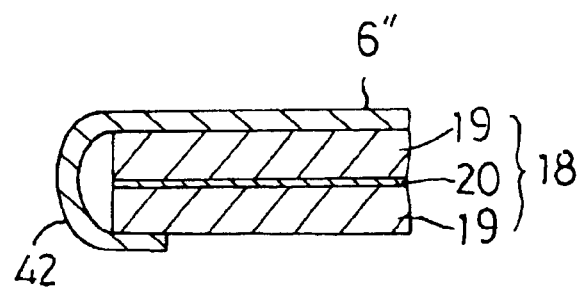
FIG. 10 is a sectional view illustrating a fixing structure using a clinch type.
Figure 11:
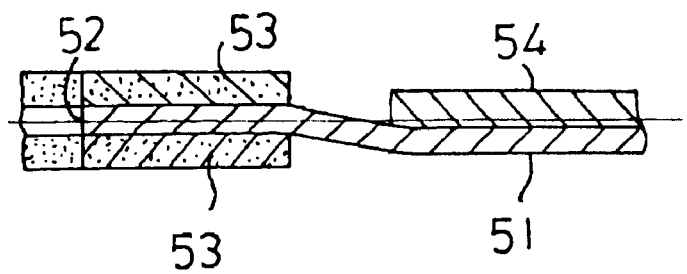
FIG. 11 is a sectional view illustrating one example of a conventional metal gasket.

FIG. 10 shows yet another example (a clinch type) of the fixing of the foam-rubber seal member to the first bead plate. In this example, a free end of the overhang of first bead plate 6" is folded to form grommet 42, and foam-rubber seal member 18 is supported from both sides by grommet 42.

What is claimed is:

1. A metal gasket for use in an engine with a chain case, the metal gasket comprising:
    at least two constitutive plates forming a total constitutive plate comprising:
        an extended part for each of the plates extended along the chain case; and
        a chain case hole for each of the plates formed in the extended part; and
    a foam-rubber seal member, mounted to a surface of the extended part for one of the constitutive plates that faces the chain case, for sealing a chain case opening and a three-surface joining portion defined by the chain case, a cylinder block and a cylinder head,
    wherein the foam-rubber seal member is a separate and distinct member and is a sheet-like and loop-like combination of layers of foam rubber and a metal core plate interposed between the layers of foam rubber, and the metal core plate is distinct from the constitutive plates.

2. The metal gasket of claim 1, wherein one of the constitutive plates is a bead plate disposed next to the cylinder head, and the foam-rubber seal member is mounted to the extended part of the bead plate.

3. A metal gasket for use in an engine with a chain case, the metal gasket comprising:
    a first bead plate disposed next to a cylinder head;
    a second bead plate disposed next to a cylinder block;
    at least one intermediate constitutive plate interposed between the first and second bead plates, the first and second bead plates and the intermediate plate forming a total constitutive plate comprising:
        an extended part for each of the plates extended along the chain case; and
        a chain case hole for each of the plates formed in the extended part; and
    a foam-rubber seal member, mounted to a surface of the extended part of the first bead plate that faces the chain case, for sealing a chain case opening and a three-surface joining portion defined by the chain case, the cylinder block and the cylinder head,
    wherein the first bead plate comprises, in the extended part, a small chain-case hole partially defined by a retainer which overhangs the chain case and is opposed to the chain case opening, and a half bead formed in the vicinity of an outside of an outer edge of the foam-rubber seal member, the small chain-case hole being provided narrower in a longitudinal direction of the first bead plate than the chain case opening,
    wherein each of the plates other than the first bead plate comprises, in the extended part, a large chain-case hole being opposed to the chain case opening, being wider in a longitudinal direction of the plate than the chain case opening and being of the nearly same shape as the chain case opening,
    wherein the foam-rubber seal member comprises, at an edge of a border of the foam-rubber seal member, an overhang of small width extending over a stepped part of the three-surface joining portion to a sealing surface of the cylinder block, the edge of the border of the foam-rubber seal member being about the cylinder block,
    wherein the outer edge of the foam-rubber seal member matches an inner edge of the large chain-case hole in shape,
    wherein an inner edge of the foam-rubber seal member matches an outer edge of the small chain-case hole in shape,
    wherein the foam-rubber seal member is fixed to the first bead plate at the retainer of the first bead plate,
    wherein the intermediate constitutive plate is, in the extended part, free from a half bead in the vicinity of the outside of the outer edge of the foam-rubber seal member, and
    wherein the second bead plate comprises a half bead opposed to the half bead of the first bead plate.

4. The metal gasket of claim 3, wherein the retainer of the first bead plate and the foam-rubber seal member corresponding to the retainer each have two or more fixing and centering knock holes, and the knock holes of the retainer pair up with the respective knock holes of the foam-rubber seal member corresponding to the retainer.

5. The metal gasket of claim 3, wherein total thickness of the foam-rubber seal member is greater than total thickness of a layered metal portion of the metal gasket that corresponds to the cylinder block in a free state prior to tightening, the total thickness of the layered metal portion functions as a stopper for preventing full compression of the foam-rubber seal member in a compressed state subsequent to tightening, and the retainer of the first bead plate functions as a stabilizing plate for stabilizing pressed shape of the foam-rubber seal member.

6. The metal gasket of claim 5, wherein the retainer of the first bead plate and the foam-rubber seal member corresponding to the retainer each have two or more fixing and centering knock holes, and the knock holes of the retainer pair up with the respective knock holes of the foam-rubber seal member corresponding to the retainer.

7. The metal gasket of claims 1, 2, 3, 4, 5 or 6, wherein two or more layers of the foam-rubber seal members are stacked one on top of another.

* * * * *